Dec. 8, 1942.  R. B. HEARN  2,304,569
TELEGRAPH SYSTEM
Filed Feb. 11, 1941
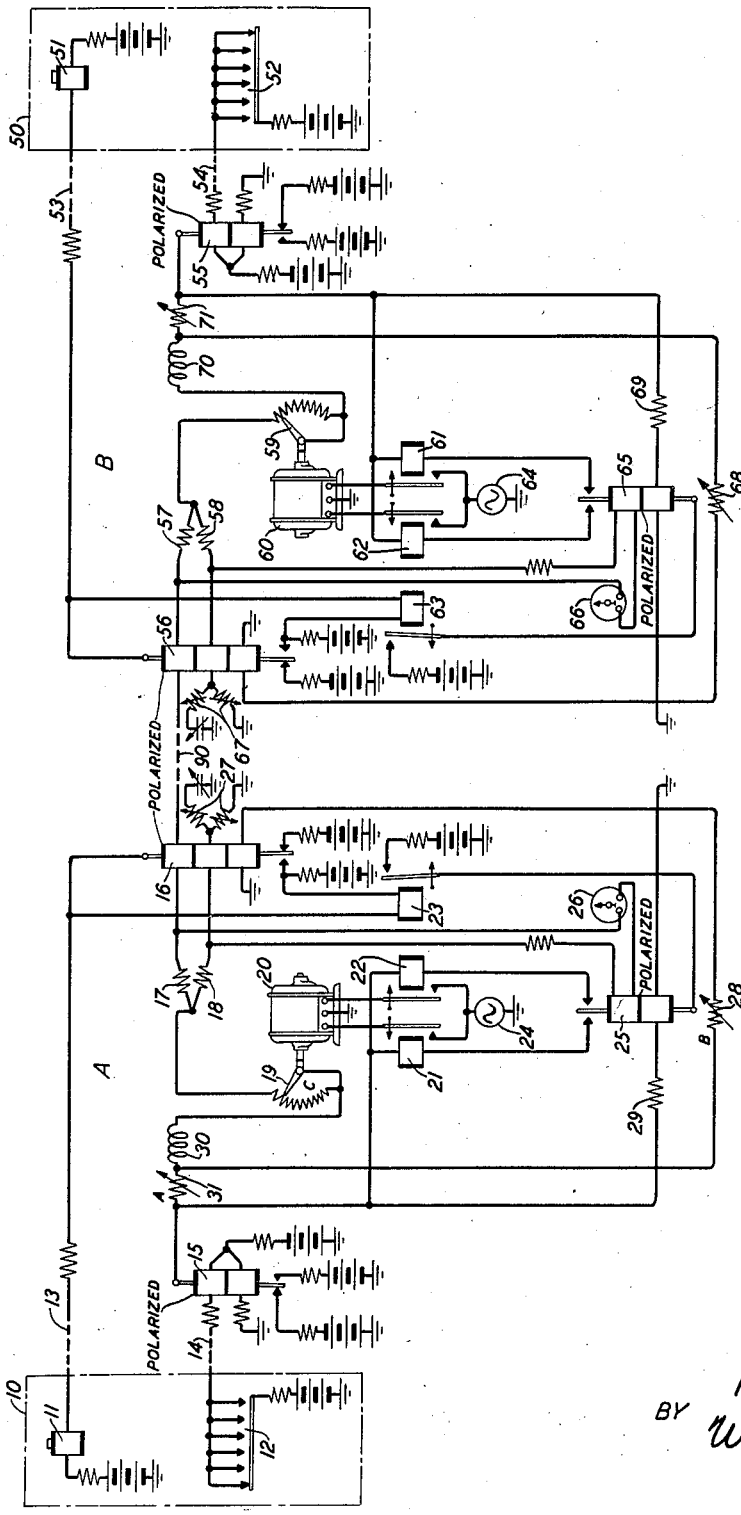
INVENTOR
R. B. HEARN
BY W. F. Simpson
ATTORNEY Patented Dec. 8, 1942

2,304,569

UNITED STATES PATENT OFFICE 2,304,569

TELEGRAPH SYSTEM

Richard B. Hearn, Hollis, N. Y., assignor to Bell Telephone Laboratories, Incorporated, New York, N. Y., a corporation of New York Application February 11, 1941, Serial No. 378,355

13 Claims. (Cl. 178—58)

This invention relates to communication systems and more particularly to telegraph systems which are affected by various weather conditions.

Telegraph lines generally are affected in two different manners by changes in the weather conditions to which they are subjected. Variations in temperature cause a variation in the resistance in the telegraph line conductors and thus a variation in the circuit resistance. In addition, the leakage resistance of open wire lines is affected by rain which causes the insulators and poles to become wet and thus reduce the leakage resistance of the system.

These effects are particularly objectionable in full duplex telegraph systems in which telegraph signals are transmitted simultaneously over a single conductor in both directions. In full duplex telegraph systems of this type it is necessary to provide an artificial line at each end to prevent the receiving relay from following or being affected by the signals transmitted from that station. In order to operate the systems at the normal telegraph speed, it is necessary that the balance between the main line and an artificial line be maintained quite accurately. Consequently, when the constants of the main line change due to variations in the weather conditions it has been necessary in the past to vary the constants of the artificial line. Several attempts have been made to automatically vary the constants of the artificial line when the constants of the main line changed. It has been attempted to accomplish this by providing some means responsive to either changes in the characteristic of the main line or changes in the difference in the characteristics of the main line and artificial line and then varying the constants of the artificial line under control of this means. Such a system is shown in U. S. Patent 2,125,704, granted to Wise, August 2, 1938.

In systems of this type it is necessary to provide a large number of different artificial lines and different constants of the apparatus and elements for varying the different artificial lines associated with different types and sizes of telegraph lines usually encountered in telegraph transmission circuits.

It is an object of this invention to provide an improved and universal means for automatically adjusting the constants of telegraph transmission circuits to compensate for changes in the characteristics of the line due to weather changes in which only one adjustment need be made after a system is initially adjusted.

A feature of this invention is directed to a compensating system which may be applied to substantially all of the different types of open wire telegraph lines usually employed for transmission of telegraph signaling impulses.

A feature of this invention relates to means for automatically adjusting a resistance in the so-called apex circuit which is common to both the main line and artificial line. It has been found that it is possible to compensate for changes in the constants of the telegraph line due to changing weather conditions by varying a resistance which is common to both the artificial line circuit and the main line circuit.

Another feature of this invention is directed to means for disabling the correcting apparatus under all signaling conditions applied to the system except when a given predetermined signal or potential condition is applied to each end of the system.

The foregoing objects and features of this invention may be more readily understood from the following description when read with reference to the attached drawing which shows a typical application of this invention to a full duplex telegraph line.

Referring now to the drawing, 10 represents a telegraph station comprising a receiving device controlled by magnet 11 and a transmitting device controlling the transmitting contacts 12. Station 10 is connected over lines 13 and 14 to a repeater point A. Repeater point A is connected by means of a full duplex line 90 to a second repeater point B. Repeater point B is in turn connected over lines 53 and 54 to a second telegraph station 50 which is provided with a receiving device controlled by magnet 51 and a transmitting device for controlling the transmitting contacts 52.

Line 90 may be any type of electrical conductor for the transmission of telegraph signaling impulses which may be operated with a ground return. That is, the circuit in which a return path is through ground. Line 90 may include both open wire lines and cable conductors or a combination of both. It also may include a telegraph channel on any of the various types of composite telegraph and telegraph circuits, including both phantom circuits and simplex circuits.

The signals are transmitted from station 10 by operation of contacts 12 which interrupt the circuit of line 14 in a well-known manner. Relay 15 at repeater point A follows the signals transmitted over line 14 and repeats them through resistance 31, inductance 30, variable resistance 19, resistance 17 and upper winding of relay 16 over line 90 which extends to repeater point B. Relay 56 at repeater point B responds to these signals and repeats them to the receiving magnet 51 of the receiving device at station 50.

Signals may be transmitted from station 50 by the operation of transmitting contacts 52. The operation of transmitting contacts 52 transmits signaling impulses over conductor 54 to the repeater station B where relay 55 responds to these signals and in turn repeats them over line 90 to the repeater station A. Relay 16 at repeater station A responds to the signals transmitted from station 50 and repeats them over line 13 to the receiving magnet 11 of the receiving device at station 10. Signals may be transmitted from both of these stations to the other stations simultaneously without interference providing the system is in proper adjustment, as is well understood.

It is to be understood that any suitable type of communication circuit between the telegraph station 10 and repeater point A which is capable of simultaneously transmitting signals in both directions may be employed. Also, any suitable type of system which is capable of simultaneously transmitting signals from repeater point B to station 50 may also be employed instead of lines 53 and 54 as shown in the drawing. Furthermore, this line or path may and usually will include some kind of switching apparatus suitable for establishing a connection of the type described herein. This system is intended for use under such circumstances that it occasionally remains "spacing" at both terminals for at least sufficient intervals for the necessary correction to take place; for example, it could be used as an interoffice trunk of the type which remains in spacing condition at both terminals during idle periods. A simple two-way circuit has been shown so that the invention may be more readily understood without being complicated by details of more complicated local transmission circuits. It is to be further understood that repeater A may be located at station 10 and repeater B at station 50. Furthermore, relay 15 may be replaced by any suitable transmitting device and relay 16 by any suitable receiving device at repeater station A. Similarly, relay 55 at station B may be replaced by any suitable transmitting device and relay 56 by any suitable receiving device.

Relay 16 at station A is provided with an upper or line winding and a middle or balancing winding. The right-hand terminal of the upper winding of relay 16 is connected to line 90, right-hand terminal of middle winding is connected to an artificial line comprising a network 27 of resistances and a condenser. The left-hand winding terminals of these windings are connected through resistances 17 and 18 to a common point which is in turn connected through the variable resistance 19 and inductance 30 and resistance 31 to the transmitting contacts of relay 15. Relays 16 and 25 are provided with biasing windings. The biasing winding of relay 16 is connected in a circuit extending from ground through the lower winding of relay 16 to battery through resistances 28 and 31 and the armature and contacts of relay 15. The biaising current for relay 16 may be adjusted by means of resistances 31 and 28. Biasing current through the winding of relay 25 is controlled by resistance 29. When the constants of the artificial line 27 are related to the constants of line 90 in some definite and predetermined manner, relay 16 will not respond to the operation of relay 15 because the net effect of the current flowing in the three windings in response to the operation of relay 15 is not changed in magnitude or direction. However, if the constants of line 90 become altered due to changes in weather conditions then the relationship between the artificial line 27 and the main line 90 will become disturbed so that the currents flowing through the upper and middle windings of relay 16 for alternate marking and spacing positions of relay 15 will no longer be compensated for by the current in the lower winding of relay 16 so that the resultant current in relay 16 while the relay 15 armature is on its right-hand contact is different from the resultant current while relay 15 armature is on its left-hand contact. Similarly, a difference will be observed in the resultant current in relay 16 when both ends of the circuit are marking as compared with the resultant current during the transmission of a spacing condition from the distant end and a marking condition from the local end. The effect of the variations of these currents may be measured by connecting some sort of measuring device across resistances 17 and 18, such as the upper winding of relay 25 and meter 26. The effects of the variation of the constants of the main line 90 may be readily observed upon a meter 26. Similarly, changes in these constants will change the current flowing through the upper winding of relay 25 to cause it to close either its right-hand or left-hand contacts. The impedance of the path through the upper winding of relay 25 and meter 26 is sufficiently high so that this path does not materially interfere with, disturb or directly influence the currents flowing through the upper and middle windings of relay 16.

The system is shown in the drawing in the marking condition. That is, marking potentials are applied by both transmitting devices 12 and 52 which maintain all of the relays of the system in their marking condition and maintain the receiving devices at the respective stations at rest. Under these conditions the operation of relay 25 is ineffective to produce any correction or compensation for changes in the characteristics or constants of line 90 because the correcting arrangement is designed to compensate for changes during the time a spacing condition is applied to both ends of line 90. So long as marking condition is applied to line 90 by the transmitting relay 55, relay 16 will remain in the position shown. When relay 16 is in the position shown a circuit is maintained for the operation of relay 23 from negative battery through the right-hand contact and armature of relay 16 through the winding of relay 23 to positive battery. The operation of relay 23 at this time interrupts the circuit through the armature of relay 25, thus rendering the operation of this relay ineffective. Similarly, so long as relay 15 is maintained in the position shown, negative battery is connected through its left-hand contact and armature to the upper winding terminals of relays 21 and 22. Consequently even if relay 23 should release and relay 25 operate to one or the other contact, the same potential would be applied to both of the winding terminals of relays 21 and 22. Consequently these relays cannot operate at this time. However, when spacing potential is applied to both ends of the main telegraph line 90, the correcting apparatus at both ends of the line will be conditioned so that it will be capable of compensating for changes in line 90 due to changes in weather conditions. Consider, for example, the apparatus at station A under these conditions. When a spacing potential is applied to line 90 at station B relay 16 will operate to its left-hand position and short-circuit the winding of relay 23. The release of relay 23 under these conditions is somewhat retarded so that this relay will not release during spacing impulses of unit length transmitted over the system but will release during the longer spacing impulses. Also during the transmission of a spacing condition from station A relay 15 will be operated to its right-hand position where it connects positive battery to the upper winding terminals of relays 21 and 22, thus conditioning these relays for operation under control of the measuring device or testing relay 25. Relays 21 and 23 are slow in operating so that they will not respond to spacing impulses of unit length transmitted by relay 15 but will respond to longer spacing impulses.

When spacing potential is applied to both ends of the line and no correction or compensation is needed the armature of relay 25 will remain between its contacts. Consequently, neither relay 21 nor 22 will be operated. However, in case some correction is needed, relay 25 will close one or the other of its contacts and cause either relay 21 or 22 to be operated as the case may be and complete a circuit for the operation of motor 20. Motor 20 will rotate the movable contact of resistance 19 in the direction to make the necessary compensation. Had the other relay been operated, motor 20 would rotate the movable contact of resistance 19 in the opposite direction, thus causing the correction to be made in the opposite direction.

As shown in the drawing, motor 20 is a reversible alternating current motor and is supplied from alternating current source 24. It is to be understood, however, that any suitable type of reversible motor or prime mover may be employed to vary resistance 19.

The manner in which the adjustment of variable resistance 19 effects compensating changes for changes in the characteristics of line 90 due to changes in weather conditions may be illustrated and described if certain specified current values are assumed by way of example. It is to be understood that this invention is in no way limited to the specific current values nor is it limited to any of the specific ratios or other relationships of currents assumed in the various lines and branches of the system.

Assuming that a first set of signaling conditions in which spacing conditions, i. e., positive potentials, are applied to both ends of line 90 by the armature of relay 15, being in its right-hand position, and the armature of relay 55 in its left-hand position. With the armatures of these relays in these positions, positive battery is connected to both ends of line 90. Consequently, no current will flow over line 90 if these sources of potential are all substantially the same value as they usually are in telegraph signaling systems and if there is no line leakage. Under these conditions a current of substantially .030 ampere will flow through the middle or balancing winding of relay 16 to ground through the balancing network 27. The circuit for this current may be traced from positive battery through the right-hand contact and armature of relay 15, resistance 31, noise suppression network 30, variable resistance 19, resistance 18, middle winding of relay 16, to ground through the artificial line 27. A circuit may also be traced from positive battery through the right-hand contact and armature of relay 15, resistances 31 and 28, to ground through the lower winding of relay 16. Current flowing through the lower winding of relay 16 is approximately 0.15 ampere under the assumed conditions. With relay 15 in its spacing condition, current flowing through the middle balancing winding of relay 16 is in a direction to move the armature of relay 16 to its left-hand position while the current flowing through the lower winding is in a direction tending to move its armature to the right-hand position.

As a second set of signaling conditions, assume that a marking condition is transmitted from a station 10 and a spacing condition from station 50. When relay 15 moves to its left-hand position in response to the marking signal and relay 55 remains in its left-hand position, the currents through the middle and lower windings of relay 16 will reverse. The operation of relay 15 to its left-hand position at this time will also cause current to flow over line 90 from negative battery through the left-hand contacts and armature of relay 15, resistance 31, noise suppression network 30, variable resistance 19, resistance 17, upper winding of relay 16, line 90, upper winding of relay 56, resistance 57, variable resistance 59, noise suppression device 70, resistance 71, armature and left-hand contact of relay 55 to positive battery. Under these conditions and with no leakage on line 90, currents through the upper winding and lower winding of relay 16 are adjusted to be substantially equal. The sum of these currents is greater than the current flowing through the middle winding of relay 16 when relay 15 was in its right-hand position. Consequently, there will be a greater potential drop across the resistance 31 at this time so that somewhat less current will flow through the lower winding of relay 16. If the average of the two currents flowing through the lower winding of relay 16 when the armature of relay 15 is in its different positions is assumed to be .015 ampere, then the current flowing through the lower winding under the first condition will be greater by some small increment having a value, say of X, while current flowing through the lower winding will be less than .015 ampere by this same amount X. Returning now to the first condition where there is .030 ampere flowing through the center winding in a spacing direction and .015+X amperes flowing through the lower winding in a marking direction, the net effect will be .030—(.015+X) or .015—X amperes holding relay 16 in its left-hand or spacing position.

Under the second set of conditions current through the upper winding and middle winding will be substantially equal and in opposite directions so that they will produce substantially no effect on the armature of relay 16. The current flowing through the lower winding of relay 16 at this time is .015—X amperes. Consequently, the relay 16 is energized by substantially the same net effective current under both conditions.

Assume now a third condition in which the armature of relay 15 remains in its right-hand position and the armature of relay 55 moves to its right-hand position. Under these circumstances currents through the upper and middle windings of relay 16 again balance each other producing substantially the same potential drop across resistance 31 as was produced in the second set of assumed conditions. Consequently, the current flowing through the lower winding of relay 16 will be .015—X amperes. This current will be in a direction tending to move the armature to its right-hand position. Consequently, the net effect of all the currents on the armature of relay 16 will be substantially the same in magnitude and thus tend to produce undistorted signals.

As a fourth set of signaling conditions, assume that both relays 15 and 55 are operated to positions shown in the drawing, the current relations will be substantially the same as under the first set of assumed conditions except that currents through the various circuits will be reversed and thus produce an effect which will cause relay 16 to be operated to the position shown in the drawing. The net effect of the currents flowing through the various windings of relay 16 upon the armature of this relay is always of substantially the same magnitude and in the proper direction so relay 16 will respond equally well to the different signaling conditions transmitted from the distant end independent of the signaling condition being transmitted by relay 15.

The system is adjusted under the first set of signal conditions, i. e., when spacing potential or positive battery is applied to both ends of line 90 and when no leakage current flows from the line. The resistance in series with the lower winding of relay 25 is also adjusted at this time so its armature will stand between the contacts, thus indicating that no correction is required. Relay 25 is designed and adjusted so that when no current flows through its windings its armature will stand between its contacts without touching or making connection with either of them. Also, when the net effect of currents through the different windings upon the armature of relay 25 is substantially zero the armature of this relay will stand between the contacts without touching either one of them.

Assume now that the leakage resistance of line 90 is reduced due to wet weather. The reduced leakage resistance will cause appreciable current to flow through the upper winding of relay 16 under the first set of signaling conditions assumed above. This current will cause an additional potential drop across both resistances 31 and 19 which will tend to decrease the current flowing through the middle and lower windings of relay 16. Under these conditions the current flowing in the upper winding of relay 16 and the middle winding of relay 16 will change. Relay 25 responds to the difference in currents flowing through these windings and will close its left-hand contact. This will complete a circuit under the assumed conditions for the operation of relay 21. Relay 21 will operate and cause motor 20 to reduce resistance 19. The reduction of resistance 19 will cause the currents flowing in line 90 and the artificial line 27 through the upper and middle windings of relay 16 to increase until substantially the same differential is reestablished between them. This increase in current through these windings will cause an increase in potential drop across resistance 31 which, in turn, causes a reduction in current flowing through the lower winding of relay 16. The current flowing through the lower winding of relay 25 has been so adjusted, as pointed out above, that relay 25 will open the left-hand contact and release relay 21 when the difference in potentials across resistances 17 and 18 is such that the difference between the currents flowing through the upper and middle windings of relay 16 is reestablished at .030 ampere. Since the current flowing through the lower winding of relay 16 is reduced by the increased potential drop in resistance 31 it will now be represented by (.015+X)—Y, and the net effect on relay 16 will be .015—X+Y. Assume that now the armature of relay 15 moves to its left-hand contact. The currents through the upper and middle windings will not be equal but if resistance 31 has been properly set, the net operating effect of the three windings on relay 16 will be .015—X+Y. The net operating effect on relay 16 will be the same magnitude but reversed in direction when both ends of the circuit are marking.

The same current magnitudes will flow through the windings of relay 16 when relay 55 moves to its marking position and relay 15 remains in its spacing position. In this case the current flowing through the respective windings of relay 16 will be in the reverse direction so the armature of relay 16 will move to its marking position.

Thus the net effect of the currents through the windings of relay 16 is always of the same magnitude, under any given set of line conditions after compensation has been completed, and in such a direction that relay 16 responds to the signals sent by relay 55 independently of the position of or signals sent by relay 15. While the balance is not fully reestablished between the upper and middle windings of relay 16, still the effect of leakage resistance on line 90 is fully compensated for.

Since the compensation is fully made on a single line current condition, i. e., both ends spacing, without reference to a second line current condition, hunting or overshooting of the correction, often encountered in automatic compensating systems, can be entirely eliminated.

The circuits at station B operate in substantially the same manner as those described at station A and cause compensations to be made in the circuits of relay 56 so that this relay will respond to the signals received from line 90 under all conditions of leakage resistance of line 90 without change of bias due to change of line leakage.

The repeater shown at stations A and B may be applied to a wide variety of telegraph lines, as for example, various types of open wire telegraph lines including simplex and phantom circuits. It may also be connected to telegraph channels of various types of composited telephone and telegraph lines. It may also be applied to communication lines in cables, as well as to the various types of composited telephone and telegraph cable circuits. In order to enable the same apparatus to be used in combination with the various types of main telegraph transmitting lines, resistances 31, 28 and 29 are provided. These resistances are initially adjusted to the required values for the particular lines to which the repeater is connected. Thereafter these resistances remain fixed and no variation is made in them unless and until a repeater is connected to a different line, at which time they may be readjusted as required by the new line. During the operation of the system after it has been initially adjusted, only resistance 19 is varied under control of the measuring relay 25.

It is obvious that it is also possible to arrange the system so that relay 25 will be effective when marking conditions of potentials of substantially the same polarity are connected to each end of the line instead of when both ends of the circuit are in a spacing condition.

What is claimed is:

1. A duplex signal transmitting system comprising a telegraph line, transmitting and receiving apparatus connected to said line, an artificial line connected to said receiving apparatus, means for measuring the difference in currents flowing through said main line and said artificial line during the time a single set of signaling conditions is applied to said line and an adjustable resistance connected in series with both said main line and said artificial line, and an operative connection between said measuring means and said single adjustable resistance for varying said adjustable resistance in accordance with the difference in currents measured by said measuring means.

2. A duplex telegraph transmitting system comprising a single transmission path, transmitting apparatus connected to said path, receiving apparatus also connected to said path, an artificial line and circuit cooperating with said receiving device to permit said transmitting and receiving apparatus to simultaneously and independently transmit to and receive signals from said path, means responsive to changes in the characteristics of said path, a resistance in series with a path through the transmitting apparatus and the circuit of said main line and also in series with a path through the transmitting apparatus and the circuit of said artificial line, and apparatus controlled by the said responsive means for varying said resistance.

3. A telegraph system comprising a first telegraph station, a second telegraph station, a telegraph line extending between said stations, telegraph transmitting apparatus at each of said stations for applying two different potential conditions to said line, the receiving apparatus at each of said stations also connected to said line, an artificial line and circuit at each of said stations cooperating with the receiving apparatus at the respective stations, means at each of said stations for responding to changes in the electrical constants of said line, a resistance traversed by current flowing from the respective transmitting apparatus and said main line and also traversed by current flowing from the respective transmitting apparatus through one of said artificial line circuits, means at each of said stations responsive to the signaling conditions applied to the ends of said line, and apparatus jointly controlled by said means responsive to changes in the electrical constants of said line and said means responsive to the signaling conditions applied to the ends of said line for varying said resistance.

4. A telegraph system in accordance with claim 3, characterized in this that said signal responsive means includes instrumentalities responsive only during the time the same potential condition is applied to both ends of the line.

5. A telegraph system comprising a telegraph line, telegraph receiving apparatus connected to said line, an artificial line circuit connected to said receiving device, means responsive to the difference in currents flowing in said telegraph line and said artificial line, an impedance common to the circuits of said telegraph line and said artificial line, biasing means for said receiving device, and a circuit for said biasing means including at least a portion of said common impedance.

6. A telegraph system comprising a telegraph line, telegraph receiving apparatus connected to said line, an artificial line circuit connected to said receiving device, means responsive to the difference in currents flowing in said telegraph line and said artificial line, an impedance common to the circuits of said telegraph line and said artificial line, biasing means for said receiving device, a circuit for said biasing means including at least a portion of said common impedance, and means controlled by said responsive means for varying at least a portion of said common impedance.

7. In a telegraph system, a telegraph line, a receiving relay comprising a main line winding, an artificial line winding, and a bias winding, an artificial line, means for connecting said main line winding in circuit relation with said telegraph line, means for connecting said artificial line winding in circuit relation with said artificial line winding, an impedance common to the circuits of both of said windings, a bias circuit including said bias winding and an impedance common to the circuits of all of said windings.

8. In a telegraph system, a telegraph line, a receiving relay comprising a main line winding, an artificial line winding, and a bias winding, an artificial line, means for connecting said main line winding in circuit relation with said telegraph line, means for connecting said artificial line winding in circuit relation with said artificial line winding, an impedance common to the circuits of both of said windings, a bias circuit including said bias winding, an impedance common to the circuits of all of said windings, means responsive to the difference in currents flowing through said main line and artificial windings, and means controlled by said responsive means for varying said impedance common to the circuits of said two windings.

9. In a full duplex telegraph system comprising a telegraph line, transmitting apparatus, a receiving relay, and an artificial line, means for compensating for variations of the leakage resistance of said line comprising means responsive to the difference of the currents flowing in said artificial line and said telegraph line, an impedance connected in series with a common circuit extending from said transmitting apparatus to both said artificial line and said telegraph line, and apparatus controlled by said responsive means for varying said impedance.

10. A duplex telegraph transmission system comprising a telegraph transmission conductor having, at one terminal of said conductor, an artificial line circuit, telegraph receiving apparatus connected to said conductor and to said artificial line circuit, telegraph transmitting apparatus, a path through said transmission apparatus and said telegraph transmission conductor, a second path through said transmission apparatus and said artificial line circuit, said paths being common through said transmission apparatus, a device operative in response to changes in the electrical characteristics of said transmission conductor, a resistance in said common path, and apparatus controlled by said device for varying said resistance.

11. A duplex telegraph transmission system for simultaneously transmitting telegraph signal impulses in both directions over a single transmission path comprising a main line circuit, an artificial line circuit, a receiving device connected to said main line circuit and to said artificial line circuit, a transmitting device connected to both of said line circuits, an impedance traversed by the entire current transmitted by said transmitting device to said main line circuit and also traversed by the entire current transmitted by said transmitting device through said artificial line circuit, apparatus responsive to changes in the electrical constants of said line, and instrumentalities for varying said resistance under control of said responsive apparatus for compensating for the changes in the electrical constants of said line.

12. A full duplex telegraph system for simultaneously transmitting signal impulses over a single transmission path in both directions without interference comprising a main line circuit, an artificial line circuit, a receiving device connected in said main line circuit and in said artificial line circuit, transmitting apparatus, an apex terminal to which said main line circuit and said artificial line circuit extend, circuit connections extending from said apex point to said transmitting apparatus, a variable impedance element connected in said last-mentioned circuit, apparatus responsive to changes in the electrical constants of said main line, and instrumentalities for varying said impedance element under control of said responsive apparatus for compensating for variations of the electrical constants of said path.

13. A telegraph system for simultaneously transmitting the signal impulses in both directions over a transmission path without interference comprising a main line circuit, a balancing artificial line circuit, a receiving relay having a main line winding connected to said main line circuit, an artificial line winding connected to said artificial line and a biasing winding, telegraph transmitting apparatus, circuit connections for joining the circuits of said main line and artificial line to form a common circuit path through said transmitting apparatus, an impedance element connected in said common path, a biasing circuit connected to said biasing winding and including at least a portion of the impedance connected in said common path, and circuit instrumentalities responsive to changes in the electrical constants of said line for varying at least a portion of the impedance in said common circuit to compensate for the changes in the electrical constants of said line.

RICHARD B. HEARN.